Figure 1:
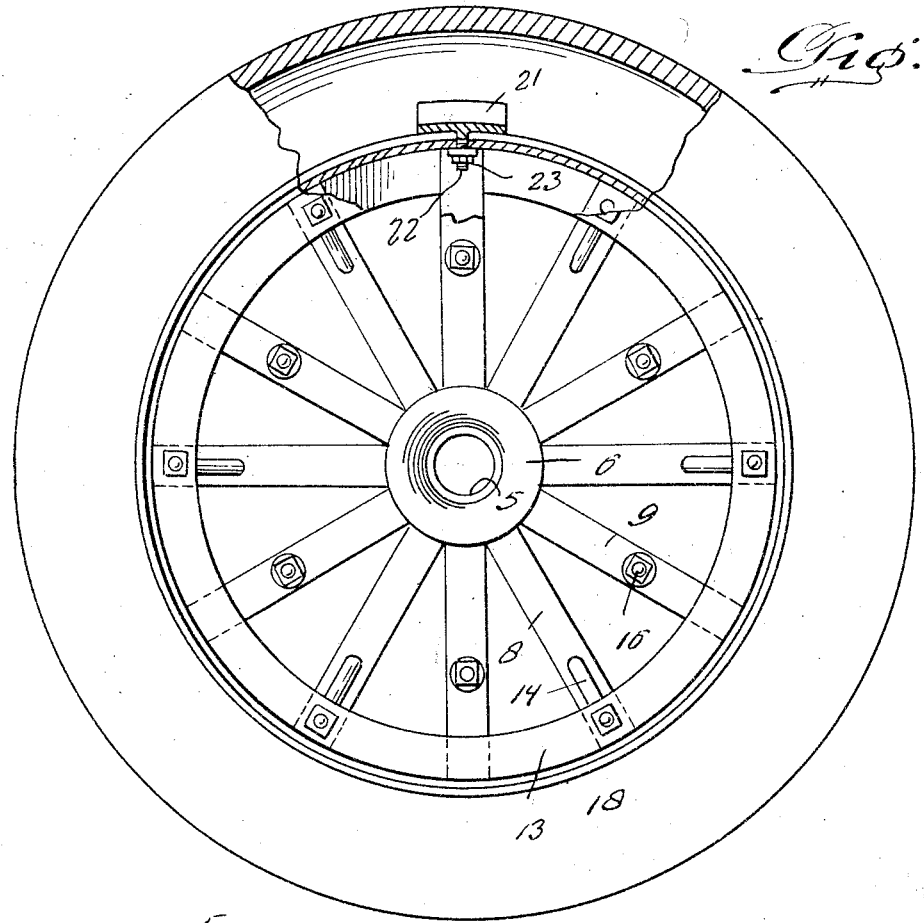

March 13, 1928.

H. POUNDS

TRACTOR WHEEL

Filed Nov. 1, 1927

1,662,208

2 Sheets-Sheet 1

Inventor
Hoyle Pounds,

By Clarence A. O'Brien
Attorney

March 13, 1928.  
H. POUNDS  
TRACTOR WHEEL  
Filed Nov. 1, 1927  
1,662,208  
2 Sheets-Sheet 2

Inventor  
Hoyle Pounds

By Clarence A O'Brien  
Attorney

Patented Mar. 13, 1928.

1,662,208

UNITED STATES PATENT OFFICE.

HOYLE POUNDS, OF WINTER GARDEN, FLORIDA.

TRACTOR WHEEL.

Application filed November 1, 1927. Serial No. 230,397.

The present invention relates to tractor wheels and has for its prime object to provide a wheel having thereon a plurality of airless non-inflated tire casings arranged alongside of each other so that the tractor wheel will operate efficiently in loose dirt, sand, and the like.

This tractor wheel has been designed particularly for use in the sandy soil such as is found in different parts of the country for example in the State of Florida in the sand ridge section.

Another very important object of the invention resides in the provision of a rubber tired tractor wheel of this nature which entirely eliminates the damage which is done to orange tree roots by grousers on the conventional tractor wheel.

Another very important object of the invention resides in the provision of a structure which will not damage orange tree limbs and fruit when the tractor is operated close to the tree.

Another very important object of the invention resides in the provision of a wheel which will not slip in the sand thus eliminating the usual back-lash in the transmission as is caused by the ordinary wheel.

A still further important object of the invention resides in the provision of a wheel of this nature which is comparatively simple in its construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
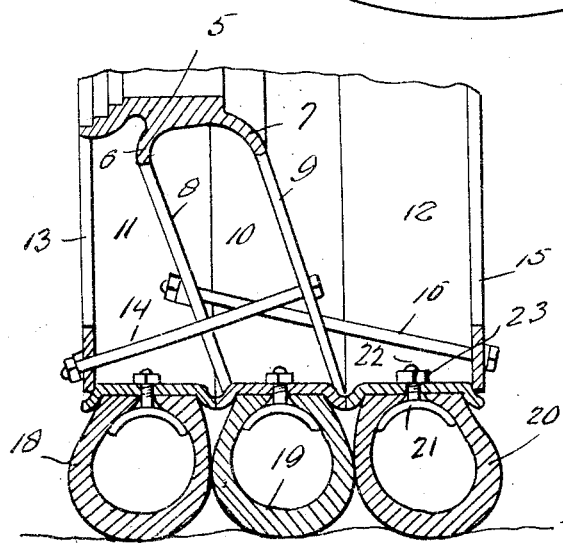
Figure 2:
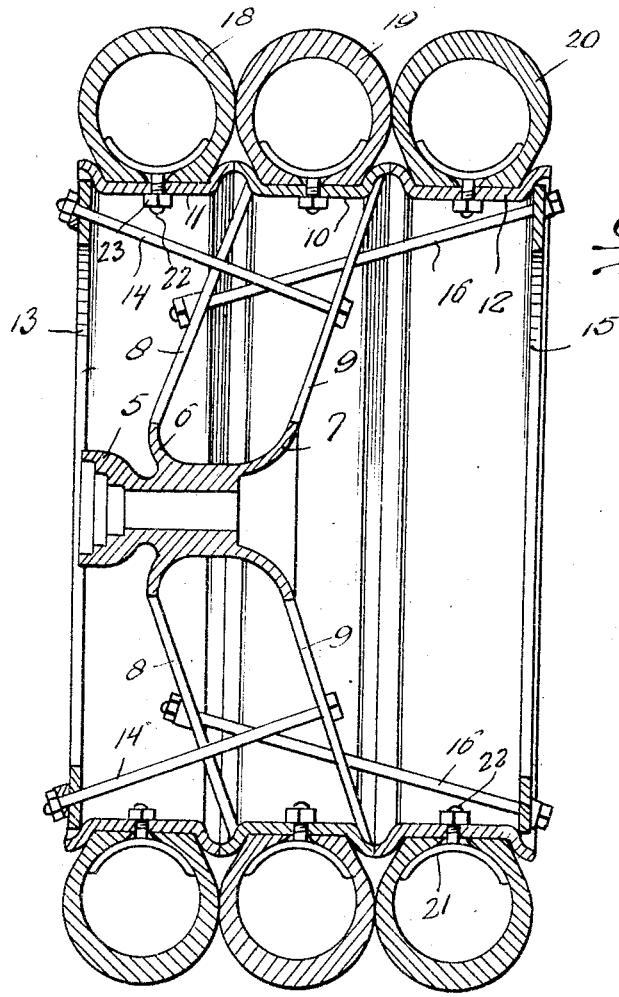
Figure 3:
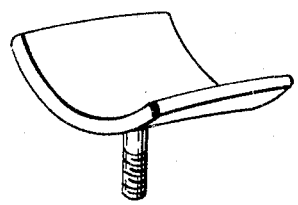

In the drawing:

Figure 1 is a side elevation of a wheel embodying the features of my invention showing one of the tire casings partly in longitudinal section, Figure 2 is a transverse vertical section therethrough, Figure 3 is a perspective view of a tire holding means, and Figure 4 is a fragmentary transverse vertical section through the lower portion of the wheel showing how the tire casings distribute the strains and stresses delivered thereto when weight is placed on the wheel.

Referring to the drawing in detail it will be seen that the numeral 5 denotes a hub having a pair of annular flanges 6 and 7 with spokes 8 and 9 respectively radiating therefrom. These spokes are inclined outwardly from the hub as is clearly illustrated in Figure 2. The spokes have formed integrally or otherwise attached to their outer end a tire rim 10. The numerals 11 and 12 denote two additional tire rims, one to each side of the rim 10. A ring 13 has bolts 14 extending therethrough and engaged with the intermediate portion of the spokes 9. This ring engages the outer edge of the rim 11. A ring 15 has bolts 16 engaged therewith and engaged with the intermediate portion of the spokes 8 and the ring 15 engages the outer edge of the rim 12. These bolts 14 and 16, therefore, hold the rims 11 and 12 concentric with the rim and as a unit therewith. The bolts 14 and 16 have detachable connection with the ring and with their respective spokes as is quite apparent from the inspection of the drawings. Thus the rims 11 and 12 are quick detachable and the bolts 14 and 16 constitute distributing elements. The parts thus far described are shown and claimed in detail in my copending application Serial No. 198,749 filed June 14, 1927.

The numerals 18, 19 and 20 denote ordinary conventional tire casings which are disposed on rims 11, 10 and 12 respectively. These casings 18, 19 and 20 are fixed to the rims in contact with each other by means of arcuate plates 21 with threaded stems 22 projecting from the concaved sides thereof through openings in the rims and having nuts 23 for holding them tightly in place so as to function as clamps, the plates 21 being disposed inside the casing so that when the nuts 23 are tightened on the stems 22, the beads are securely clamped to the rim. The plates 21 and the cooperating parts have been disclosed in my copending application, Serial No. 225,990, filed October 13, 1927.

It is thought that the construction, operation, and utility of this invention will now be quite apparent without a more detailed description of the parts thereof. When the weight of the tractor is on the wheel structure just described the ground engaging portion of the tire assumes somewhat the shape shown in Figure 4; that is, the three casings cooperate together and brace each other and do not completely collapse. The tread portions of the tires when thus loaded widen considerably so as to prevent sinking in the sand thereby providing a firm tread on the sand so that the wheel, as has been found from actual practice, is most efficient in loose sandy ground such as is found in the sand ridge section of Florida. It has also been found that this wheel structure does not harm tree roots and is less likely to harm trees and the like when the tractor is operating close thereto.

The present embodiment of the invention has been disclosed in details merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A wheel structure of the class described comprising a plurality of rims disposed in side by side relation concentric with each other, a plurality of tire casings, means for firmly clamping the tire casings on the rim, one on each rim, said casings being non-inflated and empty.

2. A wheel structure of the class described comprising a plurality of rims in side by side concentric relation and of equal diameters, a plurality of tire casings one on each rim with adjacent side walls in abutment, said tire casings being empty and non-inflated.

3. A wheel structure of the class described comprising a plurality of rims in side by side concentric relation and of equal diameters, a plurality of tire casings one on each rim with adjacent side walls in abutment, said tire casings being empty and non-inflated, means inside the casings for clamping them securely to the rim.

4. A wheel of the class described comprising a rim portion, a plurality of tire casings on the rim portion in side by side abutting relation, said casings being empty and non-inflated, and means for securing the casings to the rim portion.

5. A wheel structure of the class described comprising three rims disposed in side by side concentric relationship and of equal diameters, a plurality of tire casings of the type having split inner portions, said casings being non-inflated and in abutting side by side relation so that when weight is placed on the wheel the tire casings cooperate together to prevent total collapse thereof at the portions of engagement with the ground but causing the spread of the tread portion to a considerable extent to prevent sinking in the sand or the like and to obtain a proper grip upon the sand to prevent slipping of the wheel.

In testimony whereof I affix my signature.

HOYLE POUNDS.